Dec. 14, 1943.  G. R. DODSON  2,336,722
NIGGER BAR
Filed Sept. 3, 1941
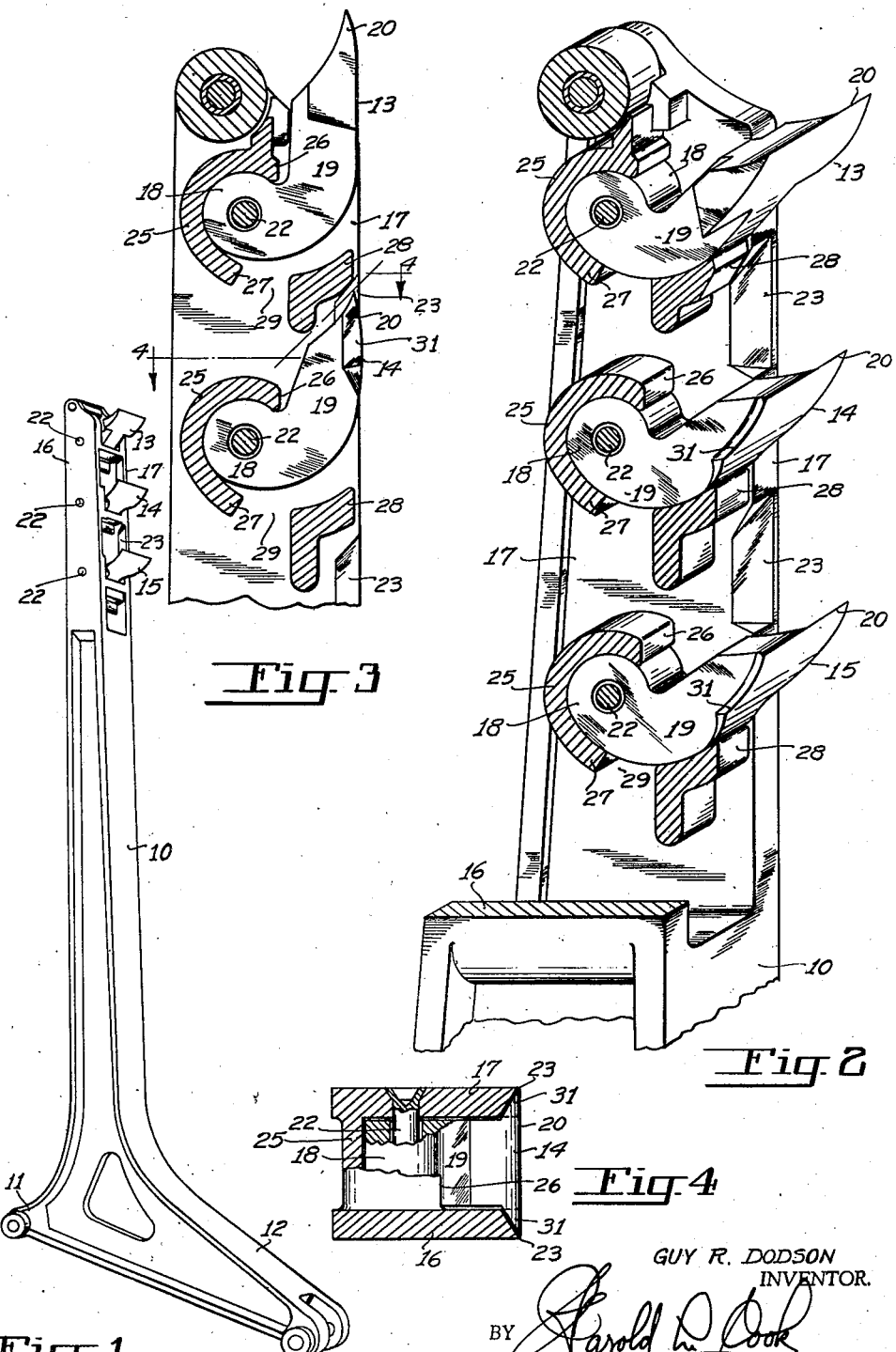
GUY R. DODSON
INVENTOR.
BY *Harold D. Cook*
ATTORNEY Patented Dec. 14, 1943

2,336,722

UNITED STATES PATENT OFFICE 2,336,722

NIGGER BAR

Guy R. Dodson, Portland, Oreg., assignor to Electric Steel Foundry Company, Portland, Oreg., a corporation of Oregon Application September 3, 1941, Serial No. 409,383

7 Claims. (Cl. 143—100)

The present invention relates to a log turner, commonly termed a nigger bar, and has for a general object the provision of a new and improved construction particularly in the arrangement of the teeth thereon.

Nigger bars usually comprise a longitudinal member which is mounted in an upright manner upon a pair of spaced, steam operable, servomotors. The nigger bar is intended primarily for shifting logs on a saw carriage and for turning them thereon to present their several sides to the saw. Teeth provided at the upper end of the bar are pivotally mounted therein so that they will extend outwardly and will bite into the log on the upward movement of the bar, while on the downward movement of the bar the teeth will pivot back into recesses so as not to mar excessively a flat surface of the log. The loosely mounted teeth inherently are subjected to very high stresses, this being particularly true of the specific means used for fastening the teeth in place, which usually comprises simple pivot pins. The nigger bars are generally the object of abnormally severe treatment in the average sawmill, since frequently it happens that the log carriage is in motion while the nigger bar is adjacent the log and the teeth are caught by projections from the log surface and given severe lateral jerks. Moreover, the nigger bar frequently is used for delivering a hammer blow against the log to knock it home on the carriage, the force of which blow is borne primarily by the teeth and the pivot pins, the latter being placed under an extremely high shear stress. These and other usages of the nigger bar result in an exceedingly high percentage of breakage of the teeth or fastening means, necessitating frequent shutdowns for repairs.

It is therefore an object of the present invention to provide a nigger bar having a plurality of teeth pivotally mounted therein in such a manner that during usage of the nigger bar the pivot fastening means is not subjected to any stresses likely to cause breakage thereof.

It is a further object of the invention to provide a nigger bar having a new and improved tooth mounting arrangement so that the teeth are capable of withstanding extremely high stresses without danger of breakage even under abnormal treatment.

A further object of the invention is to provide a new and improved construction for a retractible tooth for nigger bars which is of great strength and which is capable of lifting or turning extremely heavy logs without excessively tearing or gouging the surface thereof.

Another object of the present invention is to provide a new and improved nigger bar construction which is extremely strong, and of low cost manufacture.

Further objects and advantages of the present invention will become apparent from a study of the following description taken in connection with the accompanying drawing, while the features of novelty will be pointed out with greater particularity in the appended claims.

In the drawing, Figure 1 is a view in perspective of a nigger bar constructed in accordance with the present invention; Figure 2 is an enlarged sectional view in perspective of the upper end of the nigger bar illustrating more clearly the details of construction; Figure 3 is a side view of the upper end of the nigger bar in section, showing the teeth in full in the upper position; and Figure 4 is a cross sectional view of the nigger bar taken along the line 4—4 of Figure 3.

As shown in Figure 1, the nigger bar comprises a longitudinal shank portion 10 having outwardly extending arms 11 and 12 formed integrally therewith at the lower end, by means of which the bar may be mounted upon pistons of servomotors (not shown). In the upper end of the bar there are a plurality of teeth, indicated at 13, 14 and 15, though it will be understood that any desired number may be provided as desired. The teeth are pivotally mounted between the spaced walls 16 and 17 forming the upper end of the shank 10, and in the normal, or lowermost position they extend outwardly from the forward edge of the bar. As shown more clearly in Figures 2 and 3, each tooth comprises an eye portion 18, a shank portion 19, and a point portion 20. The eye portion extends upwardly from the rear end of the shank portion so that the teeth are generally L shaped as viewed from the side. The teeth are secured in position by pins 22 extending through cooperating openings in the walls 16 and 17 and also extending relatively loosely through the tooth eyes. The outer surface of the eye portion of each tooth is cylindrically curved, concentrically with the pivotal axis, particularly over the upper half, that is, with the shank of the tooth extending horizontally. The lower surface of the rear end of the shank portion of the tooth is curved along an arc which merges tangentially with the cylindrical surface of the eye portion. The points 20 of the teeth are of a width substantially equal to the outer width of the bar, portions being removed from the forward inner edges of the shank walls 16 and 17 forming recesses 23 for cooperatively receiving the widened tooth points 20 in the upward position thereof.

Each tooth of the bar is seated in a cylindrical bearing, each bearing being formed by a metal portion 25 integral with and bridging the space between the walls 16 and 17 above and around each of the tooth eyes. The surface of each bearing forming portion 25 next adjacent the tooth eye 18 is cylindrically curved so as to conform closely with the surface of the tooth eyes, and thus provides a smooth bearing surface therefor. As will be more fully explained hereinafter, the pins 22 extending loosely through the tooth eyes 18 act merely to retain the teeth within the bearings 25, and are not intended to carry any load. The bearing forming portions 25 extend over the upper surface of the tooth eyes, around the rear side thereof and partially therebeneath, the entire bearing portion extending preferably around the tooth eyes for substantially 180°. The forward upper edge 26 of the bearing portions 25 terminates at such a point as to permit the teeth to be pivoted to an upright position such as shown in Figure 3, while at the same time, due to the off center arrangement of the tooth eye portions, the bearing forming portions extend some distance over the tops of the tooth eyes. While the bearing may extend more than 180° around the tooth eyes, it is preferred that the cylindrically curved surface extend somewhat less than a half circle and that the lower extremity 27 flare somewhat outwardly on a greater arc than the remainder of the curved surface in order that the tooth eye will not bind in the bearing. Thus, as the load is removed from the teeth they will drop freely downwardly through the clearance about the pivot pin. As shown, the curvature of the extremity 27 conforms with the curve of the shank portion 19 of the tooth which is greater than the curvature of the main body of the eye.

Extending between the shank walls 16 and 17 beneath each of the teeth are bridging stop portions 28, the upper surface of each of which is curved so as to conform with the curvature of the surface of that portion of the shank of the tooth which is engaged thereby. The arrangement of the stop portions 28 is preferably such that each stop 28 slopes rearwardly, so that upon the application of a load the teeth will tend to slide back over the stops 28 and into a firm seating with the bearings 25. It will be observed that a space or slot 29 exists between bearings 25 and stops 28 so that chips of wood and bark will not lodge beneath the teeth to interfere with the full seating of the teeth.

In the construction described it will be apparent that as the bar is moved upwardly to bring the outwardly extending teeth into engagement with a log, a force is imposed upon the ends of the teeth which first acts downwardly upon the stop portions 28. Due to the sloping surfaces of the stop portions a large portion of this load will be transmitted through the tooth shank portions to the rear walls of the bearings 25. A straight downward force tends to pivot the teeth about the stop portions 28, but this force will be effectively resisted by the engagement of the upper surface of the tooth eye portions 18 with the cooperating upper surfaces of the bearings. Thus it will be seen that no stresses are imposed upon the pins 22 in the operation of the nigger bar, and all load stresses are transmitted directly to the side walls of the bar through the bearing and stop portions, which may be made as rugged and as strong as operating conditions or requirements may warrant.

In the usual type of nigger bar construction, the teeth which are retractible into the space between the shank walls have relatively narrow points, i. e., of a width somewhat less than the width of the spacing between the shank walls. In turning logs, particularly the heavier ones, the narrow teeth tend to tear through the surface of the log, gouging relatively deep grooves therein and necessitating the waste of a considerable amount of lumber. In the instant tooth construction the shank portions 19 are offset relative to the eye portions 18 so that in the raised position of the teeth the outer surface of the point portion is substantially flush with the forward edge of the shank 10 as shown in Figure 3. This configuration of the tooth permits of the provision of lateral extensions 31 from the opposite sides of the shank portion of the tooth adjacent the point end, which, in the raised position of the tooth, extend substantially parallel with the forward edges of the bar shank walls so as to fit cooperatively into the relatively small wall recesses 23. As illustrated more clearly in Figure 4, each of the lower teeth is of a width substantially equal to the maximum width of the nigger bar, and presents a load supporting edge substantially equal to that of the uppermost tooth. The construction affords the distinct advantage that the loading stress is distributed over a much greater area of the log and consequently tearing or gouging of the log surface is greatly minimized. This aspect is particularly important when the nigger bar is moved into engagement with a flat sawed side of the log, since gouged grooves in such a surface would result in an appreciable spoilage of lumber. The extensions 31 may have a considerable length so as adequately to reinforce these portions of the teeth against any load that may be imposed thereupon.

Having described my invention in what I consider to represent a preferred embodiment thereof, I desire to have it understood that the details shown are merely illustrative and that the invention may be carried out in other ways.

What I claim is:

1. A nigger bar comprising a shank, means in said shank forming semi-cylindrically shaped bearings, a plurality of teeth mounted in said shank, said teeth having eye portions with cylindrically curved upper surfaces seated in said bearings, each of said bearings engaging one of said teeth over and around the upper surfaces of said eye portions for receiving the lengthwise and upward levering thrust imposed by said teeth upon engagement with a log, and means in said shank for receiving the downward levering thrust imposed on said teeth by the log.

2. A nigger bar comprising a shank including a pair of parallel spaced walls, means integrally bridging said walls forming a plurality of semi-cylindrically shaped bearings, a plurality of teeth mounted between said walls, said teeth having eye portions with cylindrically curved upper surfaces seated in said bearings, said bearings engaging said teeth over and around said eye portions for receiving the lengthwise and upward levering thrust imposed by said teeth as they are moved into engagement with a log, and means integrally bridging said walls beneath said teeth for limiting downward movement of said teeth and for receiving the downward levering thrust imposed on said teeth by the log.

3. A nigger bar comprising a shank having two spaced wall portions, a plurality of teeth mounted between said wall portions, said teeth each comprising eye and point portions, means integral with said wall portions forming semi-cylindrically shaped bearings for said teeth, each of said bearings engaging one of said teeth over and around said eye portion for receiving the thrust imposed by said tooth as it is moved into engagement with a log, means for retaining said teeth in said bearings, and means integral with said wall portions forming stops adapted to be engaged by said teeth in the log engaging position thereof for receiving the downward levering thrust imposed on said teeth by the log.

4. A nigger bar comprising a shank, means in said shank comprising semi-cylindrically shaped bearings, a plurality of teeth mounted in said shank, said teeth each having eye portions with cylindrically curved upper surfaces seated in said bearings, each of said bearings engaging one of said teeth over and around the upper surface of said eye portion through an arc of substantially 180°.

5. A nigger bar comprising a shank including a pair of parallel spaced walls, a tooth pivotally mounted between said walls and swingable upwardly therebetween, said tooth having an eye portion of a width substantially equal to the spacing between said walls, a forward portion of the shank of said tooth being offset from said eye portion and having a width substantially equal to the outer width of said bar shank, said widened tooth portion being adapted to extend substantially parallel with the forward edge of the bar in the raised position of the tooth, and recesses provided in the inner portion of the forward edges of said shank walls for cooperatively receiving said widened tooth portions.

6. A nigger bar comprising a shank having two spaced wall portions, a tooth pivotally mounted between said wall portions and swingable to an upward position therebetween, said tooth comprising eye and point portions, said eye having a width substantially equal to the spacing between said wall portions, said tooth having a widened portion at the point thereof offset relative to said eye portion, recesses in the inner portion of the forward edges of said shank walls for cooperatively receiving said widened tooth portion in the raised position of said tooth.

7. A nigger bar comprising a shank having two spaced wall portions, a tooth pivotally mounted between said wall portions and swingable into an upward position, said tooth having eye and shank portions of a width substantially equal to the spacing between said walls, means integral with said wall portions forming a bearing for said tooth eye portion, said tooth having a widened portion at the lower forward edge thereof forming a point having a width substantially equal to the maximum width of said shank, recesses provided in the inner forward edges of said shank wall portions for cooperatively receiving said widened tooth portion, said shank portion being offset relative to said eye portion whereby in the raised position of said tooth the outer surface of said point is substantially flush with the forward edge of the shank walls.

GUY R. DODSON.